United States Patent [19]

Okuno et al.

[11] Patent Number: 4,722,307
[45] Date of Patent: Feb. 2, 1988

[54] INTAKE SYSTEM FOR AN ELECTRONIC CONTROL FUEL INJECTION SYSTEM FOR AN INTERNAL COMBUSTION ENGINE

[75] Inventors: Takao Okuno, Toyota; Keiichi Okabayashi, Aichi; Keizo Takahashi, Toyota; Kiyoshi Sugimoto, Okazaki, all of Japan

[73] Assignee: Toyota Jidosha Kabushiki Kaisha, Toyota, Japan

[21] Appl. No.: 845,114

[22] Filed: Mar. 27, 1986

[30] Foreign Application Priority Data

Mar. 28, 1985 [JP] Japan ................... 60-043969[U]

[51] Int. Cl.⁴ .................. F02B 27/00; F02M 9/10
[52] U.S. Cl. .................. 123/90.38; 123/52 M; 123/52 MB
[58] Field of Search .......... 123/52 M, 52 MB, 90.38, 123/195 C

[56] References Cited

U.S. PATENT DOCUMENTS

| | | | |
|---|---|---|---|
| 1,248,266 | 11/1917 | Coatalen | 123/90.38 |
| 1,803,145 | 4/1931 | Reineke | 123/52 M |
| 2,315,215 | 3/1943 | Maybach | 123/52 MB |
| 3,782,344 | 1/1974 | Schmuck | 123/52 M |
| 4,030,293 | 6/1977 | Hata | 123/52 M |
| 4,030,459 | 6/1977 | Hori et al. | 123/52 M |
| 4,510,896 | 4/1985 | Rutschmann | 123/52 MB |
| 4,549,506 | 10/1985 | Rush et al. | 123/52 MB |
| 4,622,926 | 11/1986 | Rutschmann et al. | 123/52 MB |

*Primary Examiner*—Craig R. Feinberg
*Attorney, Agent, or Firm*—Cushman, Darby & Cushman

[57] ABSTRACT

An intake system for an electronic control fuel injection system for a double overhead camshaft type internal combustion engine. The intake system has a surge tank connected via a connection pipe to a throttle body in which a throttle valve is arranged. A recess is formed between a cover for the intake camshaft and a cover for the exhaust camshaft. The throttle body is at least partially arranged in the recess.

6 Claims, 6 Drawing Figures

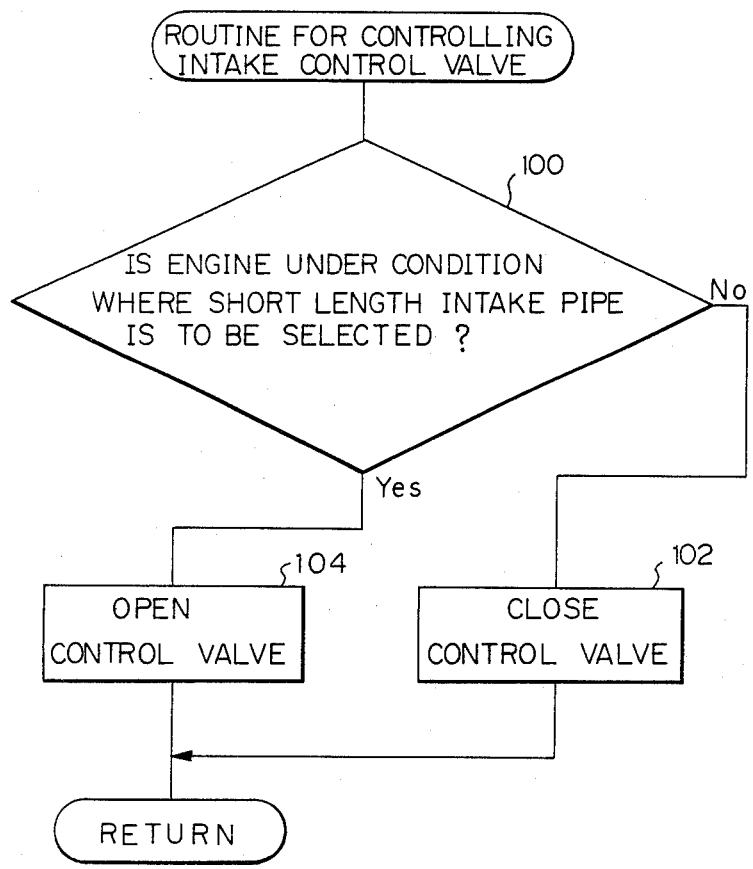

INTAKE SYSTEM FOR AN ELECTRONIC CONTROL FUEL INJECTION SYSTEM FOR AN INTERNAL COMBUSTION ENGINE

FIELD OF THE INVENTION

The present invention relates to an intake system for an electronic control fuel injection system for an internal combustion engine.

DESCRIPTION OF THE RELATED ARTS

Known in the prior art is an electric controlled fuel injection system for an internal combustion engine, wherein a throttle body provided with a throttle valve therein is connected to an engine body by way of a surge tank. A space is left between the surge tank and the engine body, and the throttle body is conveniently and usually arranged in that space. As is well known to those skilled in this art, branch pipes extend from the surge tank and terminate at a flange plate fixedly connected to intake pipes extending from intake ports of the engine body.

Recently, in the arrangement of an intake system, it is a widely practiced technique to change the effective length of the intake system in accordance with engine operating conditions, to obtain a so-called inertia intake effect and thus obtain a maximum engine power. In this case, the position of the throttle body determines the effective length of the intake system, so that the throttle body must be located at a position where the desired characteristic can be obtained. Therefore, the prior arrangement whereby the throttle body is connected to the surge tank limits the freedom to select the position of the throttle valve, and it becomes difficult to obtain a desired effective length of the intake system. To overcome this difficulty, an intermediate pipe could be provided which connects the throttle body to the surge tank. However, connection of the throttle body to the surge tank inevitably increases the height of the engine, since the throttle body must be arranged above the camshaft cover located on top of the engine body. This increased height of the engine body makes it difficult to arrange the engine in the engine room of the vehicle.

SUMMARY OF THE INVENTION

An object of the invention is to provide an intake system, capable of obtaining an increased effective length of the intake system, without substantially increasing the height of the engine.

According to the present invention, an intake system is provided for an internal combustion engine provided with a first camshaft for operating intake valves and a second camshaft for operating exhaust valves, these camshafts being covered by respective covers which form a recess therebetween, said intake system comprising: a tubular throttle body; a throttle valve arranged in the throttle body for controlling the amount of air introduced into the engine; a surge tank having intake pipes extending therefrom and connected to the respective cylinders of the engine; one end of a connection pipe being connected to the throttle body to receive air from the throttle body, and the other end of the connection pipe being connected to the surge tank;

the throttle body being at least partially arranged in the recess between the covers of the respective camshafts.

BRIEF DESCRIPTION OF THE DRAWINGS

FIG. 6 is a flowchart for operating the control valve.

DESCRIPTION OF THE PREFERRED EMBODIMENT

Figure 1:
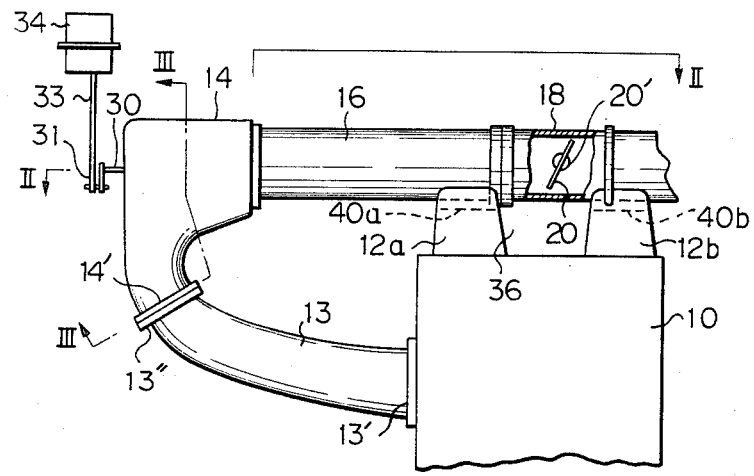
FIG. 1 shows a general side view of an internal combustion engine provided with an intake system according to the present invention.
Figure 2:
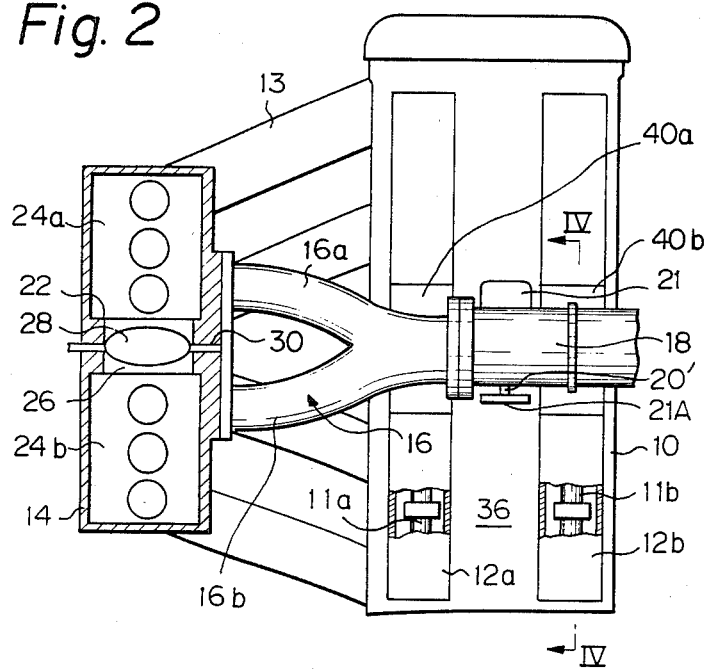
FIG. 2 shows a top view partially in cross-section taken along the line II—II in FIG. 1.
Figure 3:
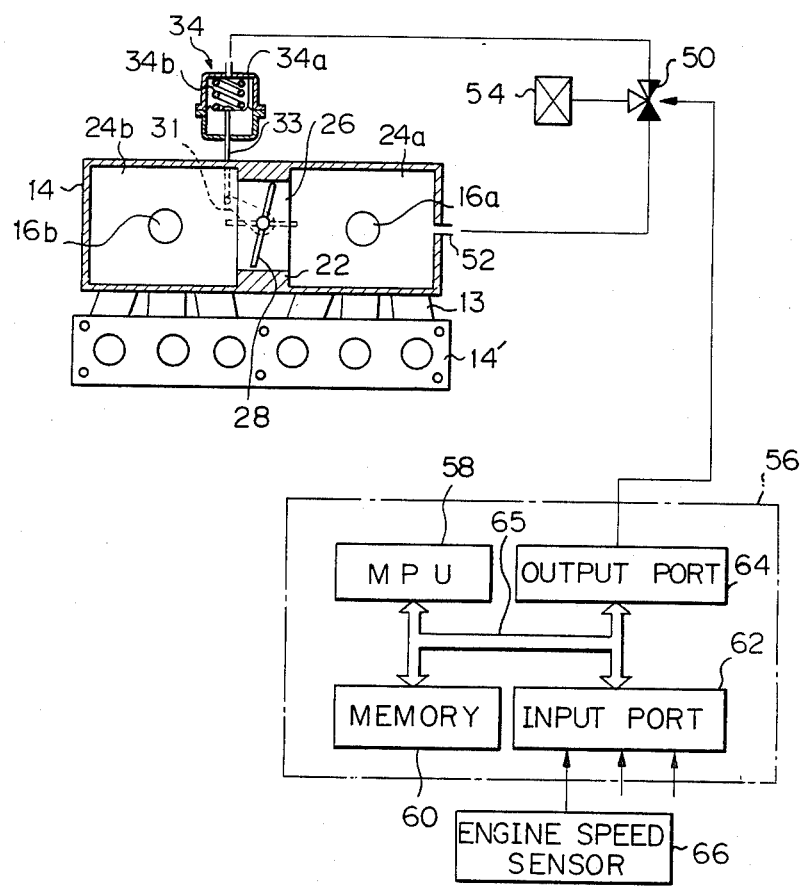
FIG. 3 is a cross-sectional view taken along the line III—III in FIG. 1 together with a vacuum control system and an electronic control system for operating the control valve.

FIGS. 1, 2, and 3 show an embodiment of the intake system according to the present invention, in which reference numeral 10 denotes a body of a 6-cylinder internal combustion engine. The engine is a double overhead camshaft type provided with a camshaft 11a for operating intake valves (not shown) and a camshaft 11b for operating exhaust valves (not shown): the camshafts 11a and 11b are covered by camshaft covers 12a and 12b, respectively. Intake pipes 13 have, at their first ends, a common flange 13' connected to the engine body 10 and connecting the intake pipes 13 to the respective combustion chambers. At their second ends the intake pipes 13 have a common flange 13" connected to a surge tank 14 at a flange portion 14 thereof. The surge tank 14 is connected to a throttle body 18 by a connection pipe 16 having two branch portions 16a and 16b, and throttle valve 20 is arranged in the throttle body 18. The throttle valve 20 has a valve shaft 20' connected to a throttle sensor 21 for issuing electric signals indicating the opening of the throttle valve 20 for various engine operation control operations, and connected to a lever member 21A for mechanically connecting the throttle valve 20 to an accelerator pedal via a not shown linking device. A detailed description of the parts 21 and 21A is omitted since they are not directly related to the feature of this invention. The throttle valve 20 is connected, via an air flow meter (not shown), to an air cleaner (not shown).

As shown in FIG. 2, the surge tank 14 has an inner partition wall 22 for dividing a space therein into two portions 24a and 24b, which are connected to a first group of intake pipes 13 of the first to third cylinders and a second group of intake pipes 13 of the fourth to sixth cylinders, respectively. The grouping is such that ignition takes place alternately between these two groups of cylinders, to maintain a strong intake air pressure wave in the intake system and thus ensure that the inertia intake effect is not weakened. The branch portions 16a and 16b are opened to these divided portions 24a and 24b of the inner space of the surge tank 14, respectively. The partition wall 22 also forms a communication passageway 26 having a cylindrical shape opened between the divided portions 24a and 24b. A butterfly type control valve 28 is arranged in the passageway 26. The valve 28 is rotated by a valve shaft 30 for selectively connecting the divided portions 24a and 24b with each other. When the control valve 28 is opened, the divided portions 24a and 24b are connected with each other so that a short effective intake length is obtained between the surge tank 14 and the intake pipes 13. When the control valve 28 is closed, the divided space portions 24a and 24b are disconnected from each other so that a long effective intake length is obtained between the connection pipe 16 and the intake pipes 13. The shaft 30 of the control valve 28 is connected, via a lever 31 and a rod 33, to an actuator 34, which operates the control valve 28 in accordance with engine operating conditions to an opened position as shown by a solid line in FIG. 3 and to a closed position as shown by a dotted line in FIG. 3, to obtain an intake length most matching the particular engine operating condition.

FIG. 3 also shows a pressure control system and an electronic control system for attaining control of the effective length of the intake line in accordance with the present invention. An electro-magnetic valve 50 is provided for selectively connecting the actuator 34 to a vacuum taking out port 52 formed in the surge tank 14, or to an air filter 54 opened to the atmosphere. The control circuit 56 is constructed as a microcomputer system, including a micro-processing unit (MPU) 58, memory 60, input port 62, outlet port 64 and a bus 65 connecting these parts with each other. Various sensors for detecting engine operating conditions, such as an engine speed sensor 66, are connected to the input port 62, so that signals indicating the engine operating conditions such as an engine speed Ne are introduced into the input port 62. The outlet port 56 is connected to the electro-magnetic valve 50 and valve operating signals from the outlet port 64 are introduced into the valve 50.

Figure 5:
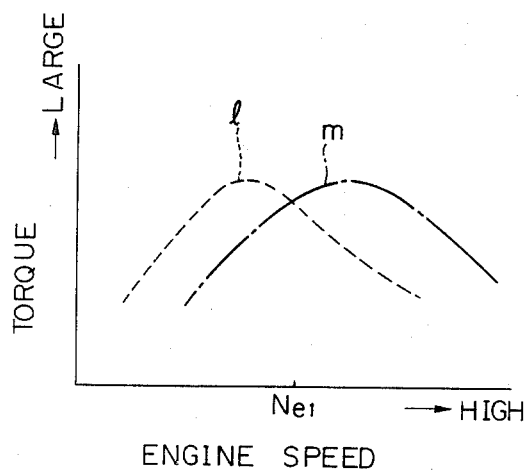
FIG. 5 shows typical relationships between the engine speed and the engine torque according to the different effective intake length.

In accordance with programs stored in the memory 60, the MPU 58 operates the electro-magnetic valve 50 in such a manner that the effective intake length selected is matched to the particular engine operating condition now experienced. In FIG. 5, a dotted line l shows a relationship between the engine speed Ne and the engine torque when the control valve 28 is closed to attain the long effective intake length, and phantom line m shows a similar relationship when the control valve is opened to attain the short effective intake length. In order to obtain high engine output torque, the effective intake length is varied in such a manner that portions of the relationships l and m providing the higher torque are selectively used. In other words, the control valve 28 is closed to obtain the relationship l when the engine speed is lower than the value $Ne_1$, and the control valve 28 is opened to obtain the relationship m when the engine speed is higher than the value $Ne_1$.

FIG. 6 shows a flow chart for attaining the above-mentioned operation of the control valve 28. Programs for attaining the flowchart are stored in the memory 60. At point 100, it is judged whether the engine is under a condition requiring the short effective length to obtain high output torque, i.e., the engine speed Ne is higher than the predetermined value $Ne_1$ in FIG. 5. If the judgement at point 100 is "No", the program goes to point 102 where a Low signal is issued from the output port 56 to de-energize the electromagnetic valve 50. As a result, with reference to FIG. 3, the actuator 34 is connected to the air filter 54 opened to the atmospheric pressure, so that the spring 34b moves the diaphragm 34a downward, causing the control valve 28 to assume the closed position shown by the solid line. When the judgement at the point 100 is "Yes", the program goes to a point 104 where a High signal is sent from the outlet port 56 to energize the electro-magnetic valve 50. As a result, the actuator 34 is connected to the vacuum taking-out port 52 so that the diaphragm 34a is moved against the force of the spring 34b, causing the control valve 28 to assume the opened position as shown by the dotted line. It should be noted that the description of the above-mentioned construction and operation of the control system for the control valve 28 is merely by way of explanation and there is no intention of limiting the invention to such construction and operation.

As shown in FIG. 1, according to the construction of the present invention, the throttle body 18 is arranged in a recess 36 formed between the cover 12a for the intake valve camshaft and the cover 12b for the exhaust valve camshaft. As previously explained, since parts such as the throttle sensor 21 and the lever 21A are attached to the throttle body 18, the system is designed so that these parts are also arranged in the recess 36 formed between the covers 12a and 12b, as much as possible. As a result of such construction, the total height of the engine is substantially maintained as it is, even if the throttle body 18 is arranged above the engine body 10.

Figure 4:
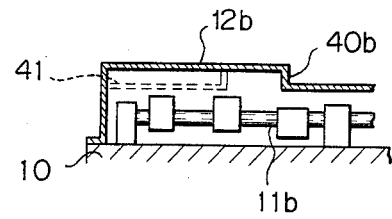
FIG. 4 is a cross-sectional view taken along the line IV—IV in FIG. 2.

Advantageously, the covers 12a and 12b are provided with recesses 40a and 40b, respectively, at positions adjacent to the throttle body 18, effectively permitting the engine height to be maintained substantially as it is. The height of the covers 12a and 12b is determined so that a filter 41 for a positive crank case ventilation device is, as shown by FIG. 4, arranged in the space inside the covers 12a and 12b at an end position of that space. Therefore, these recesses 40a and 40b can be conveniently formed at the center positions of the case without interfering with the camshafts 11a and 11b. As a result of the provision of the recesses 40a and 40b on the covers 12a and 12b, the height of the engine of the present invention can be maintained as it is, when compared with the conventional system wherein the throttle body is located on one side of the engine and is directly connected to the surge tank.

Although the present invention has been described with reference to the attached drawings, many modifications and changes may be made by those skilled in the art without departing from the scope and spirit of the invention.

We claim:

1. An intake system for an internal combustion engine provided with a first camshaft for operating intake valves and a second camshaft for operating exhaust valves, said camshafts being covered by respective covers which form a recess therebetween, said intake system comprising:

a tubular throttle body;

a throttle valve arranged in said throttle body for controlling an amount of air introduced into said engine;

a surge tank having intake pipes extending therefrom and connected to respective cylinders of said engine;

one end of a connection pipe being connected to said throttle body to receive air from siad throttle body, the other end of said connection pipe being connected to said surge tank;

at least one attachment member connected to the throttle valve;

said throttle body together with said at least one attachment member being bounded by a region formed between opposite longitudinal side portions of said respective covers and at least partially arranged in said recess between said covers of said respective camshafts.

2. An intake system according to claim 1, wherein said covers have recessed portions at positions below said throttle body respectively, wherein said throttle body is housed.

3. An intake system for a multi-cylinder internal combustion engine provided with a camshaft for operating intake valves and a camshaft for operating exhaust valves, said camshafts being covered by respective covers which form a recess therebetween, comprising:
  a tubular throttle body;
  a throttle valve arranged in said throttle body;
  a surge tank having intake pipes extending therefrom and connected to respective cylinders of said engine;
  said surge tank having a partition wall for dividing a space therein into portions each opened to intake pipes of groups of said cylinders;
  said partition wall forming a connection passageway opened to said divided portions of said space inside said surge tank;
  a control valve arranged in said connection passageway for selectively connecting said divided portions of said space;
  control means for responding to operating conditions of said engine for selectively operating said control valve in such a manner that a required effective intake length is obtained; and
  one end of a connection pipe being connected to said throttle body to receive air from said throttle valve;
  the other end of said connection pipe forming branch pipes which are respectively connected to said divided portions of said space inside said surge tank;
  said throttle body being bounded by a region formed between opposite longitudinal side portions of said respective covers and at least partially arranged in said recess between said covers.

4. An intake system according to claim 3, wherein said covers have recessed portions at positions below the throttle body, respectively, where said throttle body is housed.

5. An intake system according to claim 3, wherein said control means comprise an actuator for operating said control valve, sensing means for sensing an operating condition of said control means responding to signals from said sensing means for issuing signals directed to said actuator.

6. An intake system according to claim 5, wherein said actuator means comprise a vacuum actuator, and wherein said control means comprise an electromagnetic pressure switching valve for controlling transmission of pressure signals to said vacuum actuator and an electronic control unit for generating electric signals directed to said pressure switching valve.

* * * * *